United States Patent
Lee

(10) Patent No.: US 12,539,550 B2
(45) Date of Patent: *Feb. 3, 2026

(54) METHOD AND SYSTEM OF RIVERING FILTRATION FOR POWER SAW MACHINE

(71) Applicant: Chao-Ying Lee, Riverside, CA (US)

(72) Inventor: Chao-Ying Lee, Riverside, CA (US)

( * ) Notice: Subject to any disclaimer, the term of this patent is extended or adjusted under 35 U.S.C. 154(b) by 1421 days.

This patent is subject to a terminal disclaimer.

(21) Appl. No.: 17/097,112

(22) Filed: Nov. 13, 2020

(65) Prior Publication Data

US 2021/0060672 A1    Mar. 4, 2021

Related U.S. Application Data

(63) Continuation-in-part of application No. 15/893,671, filed on Feb. 11, 2018, now Pat. No. 10,857,688.

(51) Int. Cl.
| | | |
|---|---|---|
| *B23D 59/00* | (2006.01) | |
| *B23D 45/02* | (2006.01) | |
| *B23D 59/02* | (2006.01) | |
| *B28D 1/04* | (2006.01) | |
| *B28D 7/02* | (2006.01) | |

(52) U.S. Cl.
CPC ......... *B23D 59/006* (2013.01); *B23D 45/021* (2013.01); *B23D 59/02* (2013.01); *B28D 1/047* (2013.01); *B28D 7/02* (2013.01)

(58) Field of Classification Search
CPC .... B23D 45/02; B23D 45/021; B23D 59/006; B23D 59/02; B28D 1/02; B28D 1/04; B28D 1/043; B28D 1/044; B28D 1/047; B28D 7/02; B28D 7/04; B28D 5/0076; B28D 5/007; B24B 55/12; B24B 55/01; B24B 57/02; B24B 41/02; B24B 27/065

USPC ................................................. 125/12, 13.01
See application file for complete search history.

(56) References Cited

U.S. PATENT DOCUMENTS

| | | | | |
|---|---|---|---|---|
| 3,960,728 A | * | 6/1976 | Otzen ................... | B01D 29/27 210/167.01 |
| 5,205,686 A | * | 4/1993 | de Caussin ........ | B23Q 11/0057 409/137 |
| 5,331,769 A | * | 7/1994 | Walton .................... | B24B 55/03 451/449 |

(Continued)

FOREIGN PATENT DOCUMENTS

| | | | | |
|---|---|---|---|---|
| CA | 2262332 A1 | * | 7/2000 | ........... B23D 47/025 |

*Primary Examiner* — Makena S Markman
(74) *Attorney, Agent, or Firm* — David & Raymond Patent Firm; Raymond Y Chan

(57) ABSTRACT

A rivering filtration system for a power saw machine includes a filtration tray having a filtration cavity for collecting operation fluid after the operation fluid is delivered onto the cutting blade, and a fluid collecting tray located underneath the filtration tray, wherein the fluid collecting tray has first and second cavities. The filtration tray provides a first filtration stage for filtrating the visible residual particles out from the operation fluid. The fluid collecting tray provides a second filtration stage that the operation fluid is slowly filled in the first cavity from the filtration cavity to ensure slurry residual particles in the operation fluid being deposited at the first cavity, and a third filtration stage that the operation fluid is slowly filled in the second cavity from the first cavity to ensure the slurry residual particles being filtrated out of the operation fluid.

13 Claims, 8 Drawing Sheets

(56) References Cited

U.S. PATENT DOCUMENTS

| | | | | |
|---|---|---|---|---|
| 5,676,124 | A * | 10/1997 | Lee | B28D 1/047 |
| | | | | 451/342 |
| 9,168,674 | B2 * | 10/2015 | Walker | B28D 7/02 |
| 10,596,725 | B2 * | 3/2020 | Kasper | B28D 7/02 |
| 2007/0197139 | A1 * | 8/2007 | Wise | B28D 1/044 |
| | | | | 451/41 |
| 2010/0288257 | A1 * | 11/2010 | Wei | B28D 1/047 |
| | | | | 125/35 |
| 2011/0192262 | A1 * | 8/2011 | Loveless | B23D 59/006 |
| | | | | 55/482 |
| 2012/0118278 | A1 * | 5/2012 | La Banco | B23D 59/02 |
| | | | | 125/35 |
| 2013/0055865 | A1 * | 3/2013 | Sheddy | H02K 7/14 |
| | | | | 83/98 |
| 2014/0157965 | A1 * | 6/2014 | Simon | B27C 9/02 |
| | | | | 83/167 |
| 2014/0261367 | A1 * | 9/2014 | Ipatenco | B28D 1/04 |
| | | | | 125/13.01 |
| 2015/0367527 | A1 * | 12/2015 | Elemstrand | B28D 1/047 |
| | | | | 125/14 |
| 2015/0367530 | A1 * | 12/2015 | Vikholm | B28D 1/042 |
| | | | | 125/13.01 |
| 2017/0050338 | A1 * | 2/2017 | Lee | B28D 7/02 |
| 2017/0120477 | A1 * | 5/2017 | Chang | B28D 7/04 |
| 2018/0053960 | A1 * | 2/2018 | Patterson, Jr. | H01M 8/2484 |
| 2019/0217404 | A1 * | 7/2019 | Guth | B23D 59/02 |
| 2019/0262917 | A1 * | 8/2019 | Kordus | B23D 63/12 |
| 2020/0016792 | A1 * | 1/2020 | Chang | B28D 1/04 |
| 2020/0156285 | A1 * | 5/2020 | Kasper | B23D 59/006 |

* cited by examiner

Operation fluid from the cutting blade 11 is ejected tangentially downwards towards the down-sloping channel 22 for funneling the operation fluid.

Pre-filtration stage

Operation fluid as it flows down the down-sloping channel 22 and deposits large debris, most of landing in the down-sloping channel 22 will get stuck here.

Stage 1 filtration

Collection of operation fluid begins at the filtration cavity 21 where the speed of operation fluid slows as it gather in the filtration cavity 21 of the filtration tray 20.

Stage 2 filtration

Operation fluid that overflows from the filtration tray 20 collects in the first cavity 31. In this first cavity 31, operation fluid is free of visible debris/contaminants.

Stage 3 filtration

Operation fluid that overflows from the first cavity 31 collects in the second cavity 32, where the majority of the operation fluid is free of micro debris and is less saturated of slurry reducing fluid pump 15 wear.

Stage 4 filtration

Operation fluid that overflows from the second cavity 32 collects in the fluid collector 40 under the fluid collecting tray 30. The fluid pump 15 can be placed in the fluid collector 40 to pump the operation fluid up to the cutting blade 11.

FIG. 5

METHOD AND SYSTEM OF RIVERING FILTRATION FOR POWER SAW MACHINE

CROSS REFERENCE OF RELATED APPLICATION

This is a Continuation-In-Part application that claims priority to U.S. non-provisional application, application Ser. No. 15/893,671, filed Feb. 11, 2018, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a cutting machine, and more particularly to a method and system of rivering filtration for a power saw machine, which provides multiple filtration stages for detouring and filtering operation fluid during the cutting operation, such that the filtered operation fluid can be immediately re-used for the cutting operation.

Description of Related Arts

Conventional cutting machines are widely used in various industries for provision of rapid and high quality cutting of such construction and manufacturing materials as granite, marble, slate, pave, brick, ceramics, and masonry. A conventional cutting machine generally comprises a cutting platform for supporting a work piece thereon, and a cutter head which is suspended and supported above the cutting platform, wherein the cutter head comprises a cutting blade driven by a motor to cut the work piece laid on the cutting platform. In particular, the cutting blade is rotated at a spin direction to define a front cutting point at the circumferential edge of the cutting blade, wherein the front cutting point of the cutting blade contacts with the work piece to cut through the work piece.

Especially the tile and masonry saws, the motor must provide a higher power to drive the cutting blade to rotate. As the friction between the cutting blade and the work piece generates heat, the cutting machine further comprises a cooling machine to cool down the cutting blade during the cutting operation to prevent the damage of the cutting blade by the heat. Therefore, the cutting machine further comprises a fluid delivering mechanism for cooling and/or lubricating the cutting blade during the cutting operation.

The fluid delivering mechanism is arranged to deliver operation fluid directly onto the cutting blade in the direction of the blade rotation before it is contacted with the work piece, such that the operation fluid will be encouraged to stay on the cutting blade causing over saturation. Accordingly, the operation fluid can be liquid coolant, such as water, and/or lubricant, being delivered onto the cutting blade during the cutting operation. It is worth mentioning that residual particles are formed while the cutting blade is rotatably cutting on the work piece. The residual particles will be spit out of the cutting platform that most of the residual particles are spread at the surroundings. Therefore, the residual particles are considered as one of the pollutions and are hazardous for the user since the residual particles may enter into the user's body during inhalation.

The residual particles can be collected by the operation fluid when the operation fluid is sprayed onto the cutting blade. Then, the operation fluid with the residual particles will be collected at a bottom tray which is located underneath the cutting blade. It is worth mentioning that in order to maintain a higher rotational speed of the cutting blade, the operation fluid must be continuously sprayed onto the cutting blade to cool down the relatively high temperature of the cutting blade during the cutting operation. In other words, a relatively large amount of operation fluid must be prepared for the entire cutting operation. Once the cutting operation is completed, the used operation fluid will be collected in the bottom tray for further treatment. For example, the used operation fluid can be filtrated to filter out the residual particles so that the operation fluid can be re-used for next cutting operation after the filtration treatment.

For the environmental concern, it is a need to have a control of air and land pollution to save our lives. However, the making of the residual particles during the cutting process cannot be avoided. Therefore, a solution must be found out to prevent the residual particles spitting out from the cutting blade and to minimize the amount of operation fluid being used for the cutting operation.

SUMMARY OF THE PRESENT INVENTION

The invention is advantageous in that it provides a method and system of rivering filtration for a power saw machine, which provides multiple filtration stages for detouring and filtering operation fluid during the cutting operation.

Another advantage of the invention is to a method and system of rivering filtration for a power saw machine, wherein the filtering element is detachably disposed at the filtration tray to initially filter the heavy debris of the operation fluid before collecting in the filtrating cavity of the filtration tray.

Another advantage of the invention is to a method and system of rivering filtration for a power saw machine, wherein the operation fluid filtered by the rivering filtration system can be immediately re-used for the cutting operation.

Another advantage of the invention is to a method and system of rivering filtration for a power saw machine, wherein the rivering filtration system is arranged to control the speed and direction the operation fluid in order to effectively filter out the residual particles, such as debris and slurry, from the operation fluid after used.

Another advantage of the invention is to a method and system of rivering filtration for a power saw machine, wherein different sizes of residual particles are progressively collected through the rivering filtration method for effectively collecting the residual particles from the operation fluid during the cutting process so as to ensure clean operation fluid being re-used.

Another advantage of the invention is to a method and system of rivering filtration for a power saw machine, wherein once the operation fluid is filtrated and clean, the operation fluid is guided back to deliver to the cutting blade for the cutting operation, so as to minimize the usage amount of operation fluid needed to be prepared for the cutting operation.

Another advantage of the invention is to a method and system of rivering filtration for a power saw machine, which is a cost-effective, non-chemical usage and natural treatment technology to treat the operation fluid.

Another advantage of the invention is to a method and system of rivering filtration for a power saw machine, which can effectively collect the residual particles when the work piece is cut by the cutting blade, so as to avoid the air and land pollution.

Another advantage of the invention is to a method and system of rivering filtration for a power saw machine, wherein the rivering filtration system can be incorporated with any existing power saw machine.

Another advantage of the invention is to a method and system of rivering filtration for a power saw machine, which does not require to alter the original structural design of the power saw machine, so as to minimize the manufacturing cost of the power saw machine incorporating with the rivering filtration system.

Another advantage of the invention is to a method and system of rivering filtration for a power saw machine, wherein no expensive or complicated structure is required to employ in the present invention in order to achieve the above mentioned objects. Therefore, the present invention successfully provides an economic and efficient solution for providing an environment friendly configuration for the cleaning the operation fluid.

Additional advantages and features of the invention will become apparent from the description which follows, and may be realized by means of the instrumentalities and combinations particular point out in the appended claims.

According to the present invention, the foregoing and other objects and advantages are attained by a power saw machine, which comprises a cutting head arrangement, an operation fluid delivery arrangement, and a rivering filtration system.

The cutting head arrangement comprises a cutting blade being driven to rotate for contacting with a work piece at a cutting point during a cutting operation. The operation fluid delivery arrangement comprises a fluid nozzle unit for delivering operation fluid onto a cutting edge portion of the cutting blade.

The rivering filtration system is arranged for filtrating residual particles in the operation fluid after the operation fluid is delivered onto the cutting blade, wherein the rivering filtration system comprises a filtration tray supported underneath the cutting blade and a fluid collecting tray located underneath the filtration tray.

The filtration tray has a filtration cavity for collecting operation fluid after the operation fluid is delivered onto the cutting blade, wherein the filtration tray provides a first filtration stage for filtrating the visible residual particles out from the operation fluid.

The fluid collecting tray has first and second cavities, wherein the fluid collecting tray provides a second filtration stage and third filtration stage. At the second filtration stage, the operation fluid is slowly filled in the first cavity from the filtration cavity to ensure slurry residual particles in the operation fluid being deposited at the first cavity. At the third filtration stage, the operation fluid is slowly filled in the second cavity from the first cavity to ensure the slurry residual particles being filtrated out of the operation fluid.

In accordance with another aspect of the invention, the present invention comprises a rivering filtration method of a power saw machine for filtrating operation fluid after the operation fluid is delivered onto a cutting blade of the power saw machine, comprising the following steps.

(A) Collect the operation fluid in a filtrating cavity of a filtration tray which is supported underneath the cutting blade to ensure visible residual particles in the operation fluid being deposited at the filtrating cavity, so as to filtrate the visible residual particles out from the operation fluid by the filtration tray.

(B) Slowly fill the operation fluid in a first cavity of a fluid collecting tray from the filtration tray to ensure slurry residual particles in the operation fluid being deposited at a cavity bottom wall of the first cavity.

(C) Slowing fill the operation fluid in a second cavity from the first cavity to ensure the slurry residual particles being filtrated out of the operation fluid.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 5 is a block diagram illustrating a rivering filtration system according to the above preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
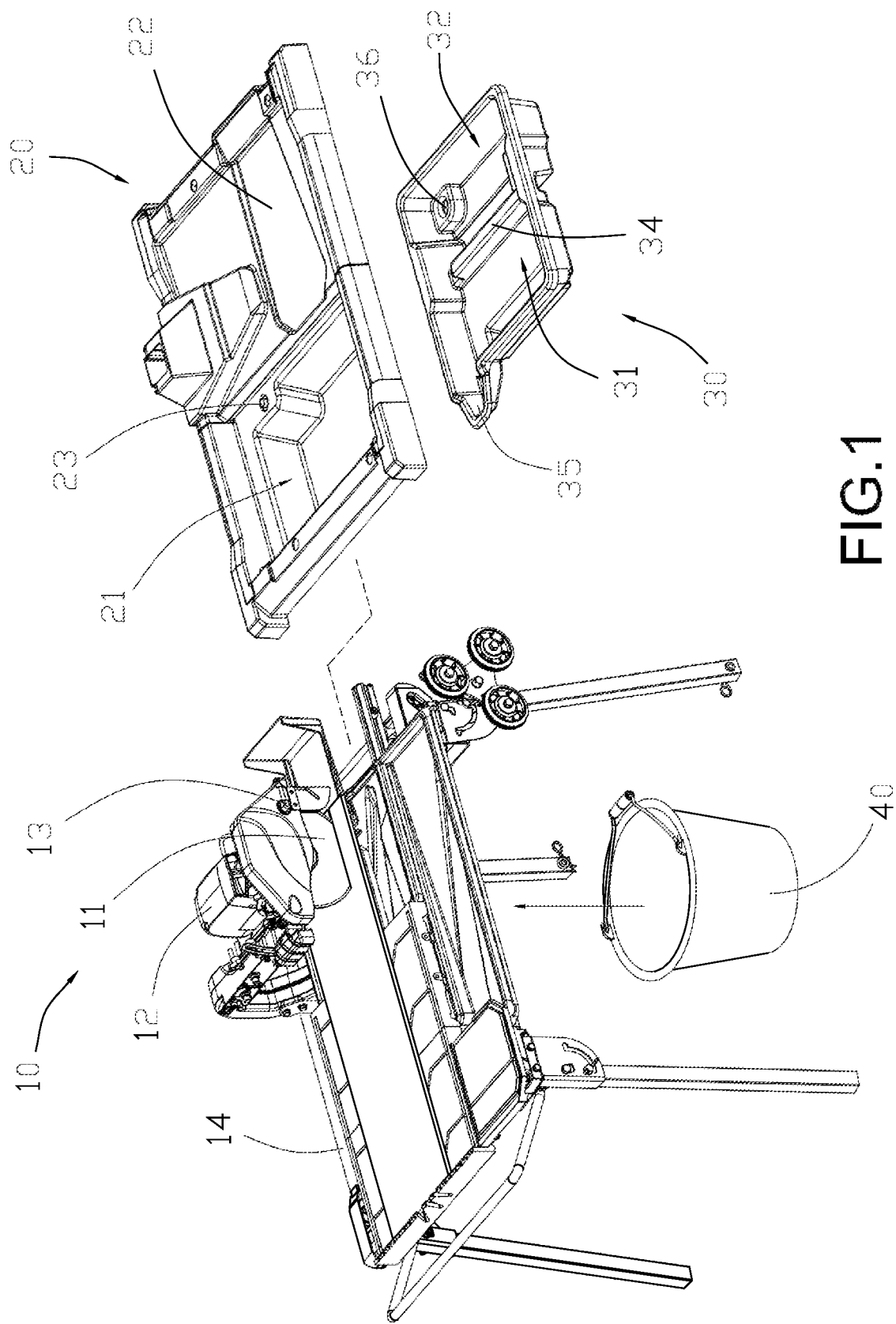
FIG. 1 is an exploded perspective view of a power saw machine with a rivering filtration system according to a preferred embodiment of the present invention.

Referring to FIG. 1 of the drawings, a power saw machine 10 for cutting a work piece according to a preferred embodiment of the present invention is illustrated, wherein the power saw machine comprises a motor assembly, a cutting head arrangement, and a supporting frame 14 for supporting the motor assembly and the cutting head arrangement. Accordingly, the cutting machine can be a hand-held machine, wherein a carrying handle is provided, such that a user is able to carry the cutting machine via the carrying handle to cut the work piece.

According to the preferred embodiment, the cutting machine is embodied as a work station. The cutting head arrangement comprises a cutting blade 11 powered by a motor 12 of the motor assembly, wherein the cutting blade 11 is driven to rotate for contacting with the work piece at a cutting point during a cutting operation. The power saw machine further comprises an operation fluid delivery arrangement comprises a fluid nozzle unit 13 for delivering operation fluid onto a cutting edge portion of the cutting blade. Accordingly, the operation fluid can be liquid coolant, such as water, and/or lubricant, being delivered onto the cutting blade during the cutting operation, Residual particles will be collected by the operation fluid when the operation fluid is sprayed onto the cutting blade during the cutting operation. It is worth mentioning that the operation fluid from the cutting blade 11 is ejected tangentially downwards towards the supporting frame 14.

Figure 3:
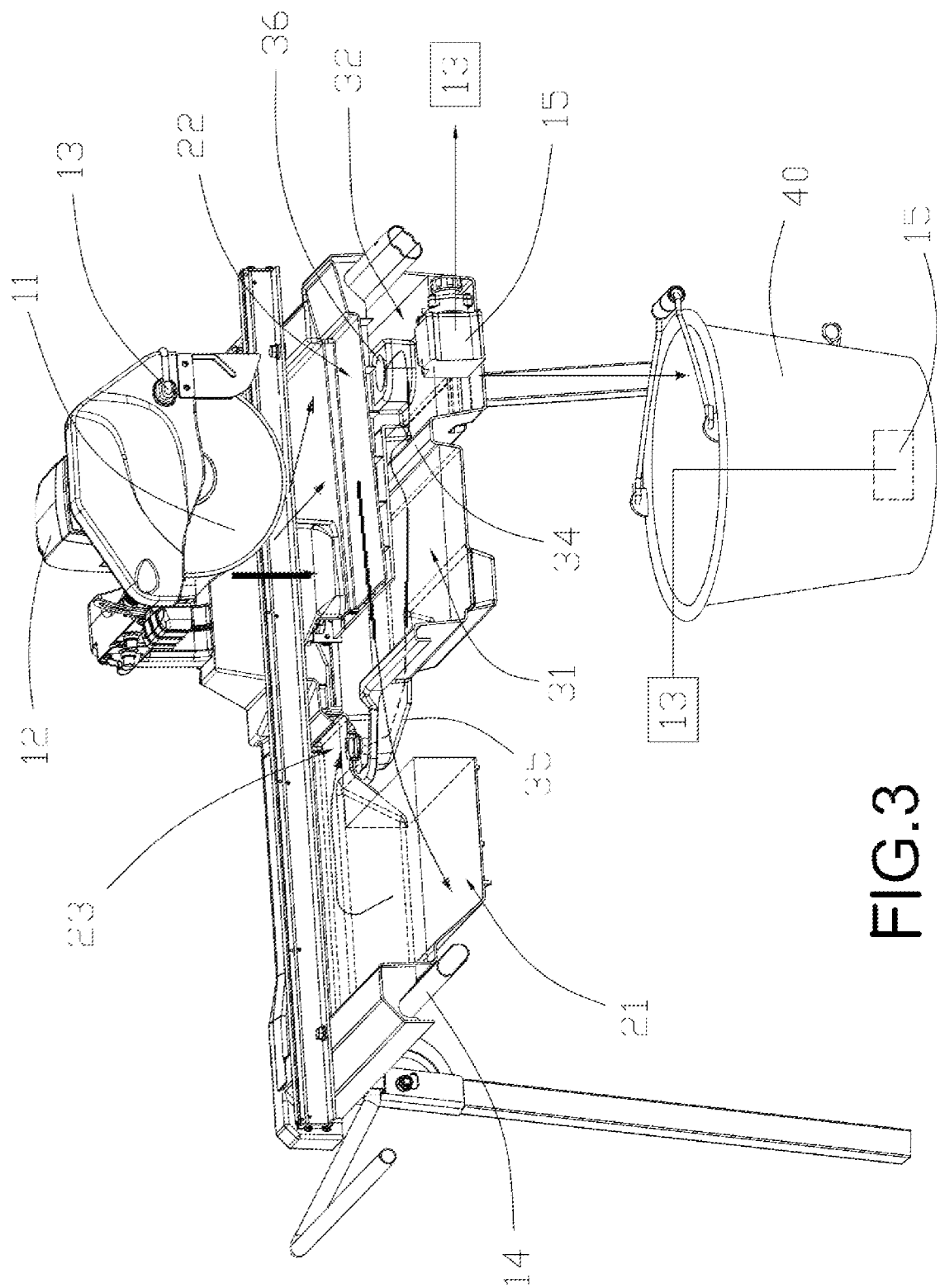
FIG. 3 illustrates a filtration flow of operation fluid by the rivering filtration system according to the above preferred embodiment of the present invention.

According to the preferred embodiment, the power saw machine further comprises a rivering filtration system which provides multiple filtration stages for filtrating the residual particles in the operation fluid after the operation fluid is delivered onto the cutting blade, as shown in FIGS. 1, 3 and 5. The rivering filtration system comprises a filtration tray 20 supported underneath the cutting blade 11 and a fluid collecting tray 30 located underneath the filtration tray 20.

As shown in FIG. 3, the filtration tray 20 is detachably coupled to the supporting frame 14 at a position that the filtration tray 20 is located underneath the cutting blade 11, such that the operation fluid from the cutting blade 11 is ejected tangentially downwards towards the filtration tray 20.

The filtration tray 20 has a filtration cavity 21 for collecting the operation fluid after the operation fluid is delivered onto the cutting blade 11, wherein the filtration tray 20 provides a first filtration stage for filtrating the visible residual particles out from the operation fluid. The visible residual particles can be large debris and/or contaminant.

Figure 2:
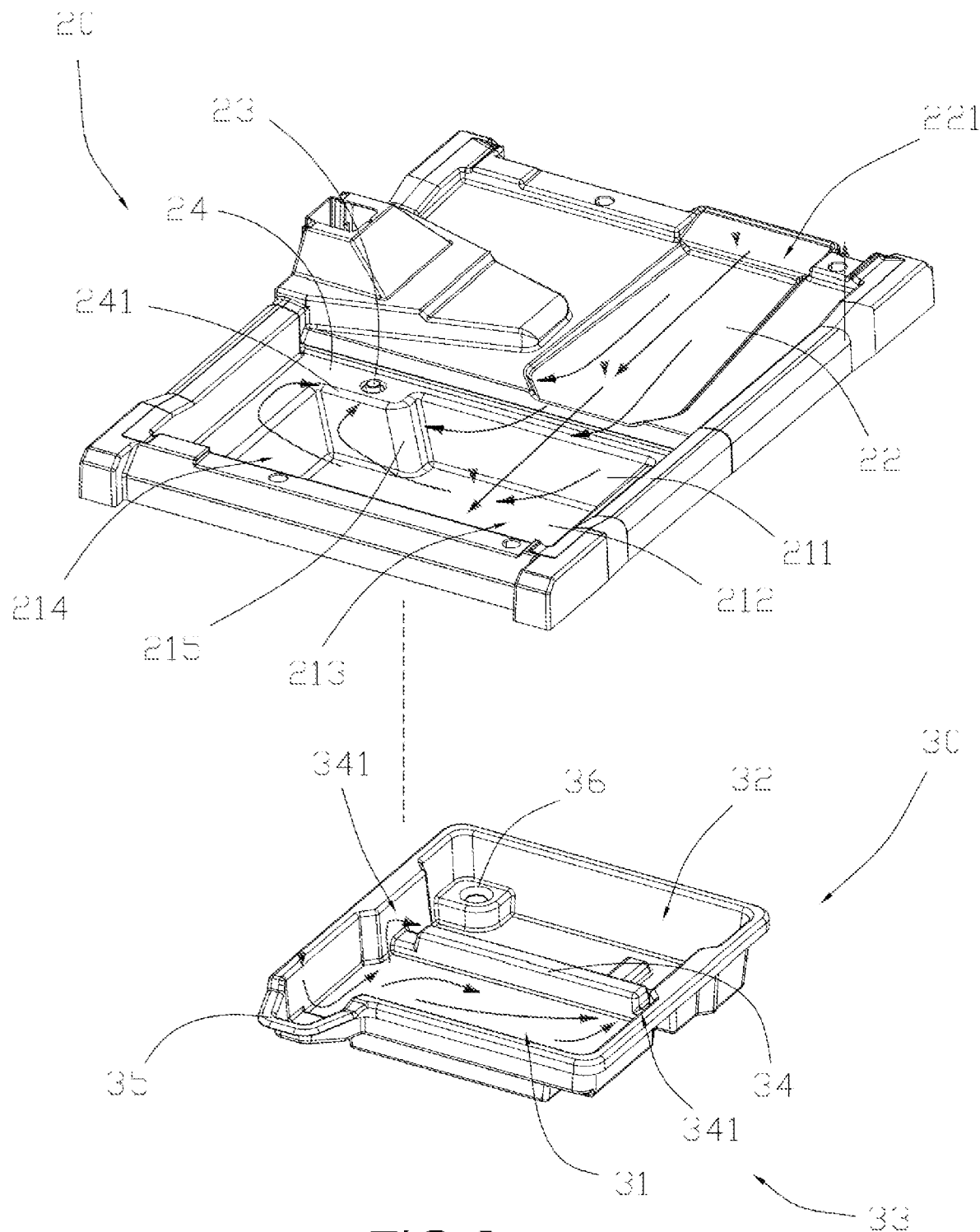
FIG. 2 is an exploded perspective view of the rivering filtration system according to the above preferred embodiment of the present invention.

The filtrating cavity 21 is defined within a cavity surrounding wall 211 and a cavity bottom wall 212. The filtrating cavity 21 further has a first side portion 213 and a second side portion 214 located side-by-side, wherein the operation fluid flows from the first side portion 213 of the filtrating cavity 21 to the second side portion 214 thereof. As shown in FIG. 2, the cavity surrounding wall 211 has a cornering portion 215 formed between the first side portion 213 and the second side portion 214 of the filtrating cavity 21 for detouring the direction of the operation fluid being flowed from the first side portion 213 of the filtrating cavity 21 to the second side portion 214 thereof. In other words, a width of the first side portion 213 of the filtrating cavity 21 is larger than a width of the second side portion 214 of the filtrating cavity 21. It is worth mentioning that a depth of the first side portion 213 of the filtrating cavity 21 is the same as a depth of the second side portion 214 of the filtrating cavity 21. It is appreciated that the depth of the first side portion 213 of the filtrating cavity 21 can be different from that of the second side portion 214 of the filtrating cavity 21.

The filtration tray 20 further has a down-sloping channel 22 for guiding the operation fluid from the cutting blade to flow along the down-sloping channel so as to land a larger size of the residual particle thereon. Particularly, the operation fluid from the cutting blade 11 is ejected tangentially downwards towards the down-sloping channel 22. In other words, majority of operation fluid, i.e. coolant/lubricant and debris, is ejected from the cutting blade 11 along the down-sloping channel 22.

As shown in FIG. 2, an exit of the down-sloping channel 22 is extended to the cavity surrounding wall 211 of the filtrating cavity 21 for guiding the operation fluid being flowed into the filtrating cavity 21 to ensure the residual particles being deposited at the cavity bottom wall 212 of the filtrating cavity 21. The down-sloping channel 22 is transversely extended to the first side portion 213 of the filtrating cavity 21, such that the operation fluid is guided to initially flow along the down-sloping channel 22 to the first side portion 213 of the filtrating cavity 21.

The down-sloping channel 22 has a stairway entrance 221 for speeding up a flow of the operation fluid along the down-sloping channel 22, wherein a width of the down-sloping channel 22 is gradually increased toward the exit thereof. The stairway entrance 221 of the down-sloping channel 22 is formed at a surrounding rim of the filtration tray 20, wherein the down-sloping channel 22 is extended to a position that the exit thereof is extended to the first side portion 213 of the filtrating cavity 21. Therefore, the speed of the operation fluid is increased at the stairway entrance 221 to ensure the operation fluid flowing along the down-sloping channel 22. Then, the speed of the operation fluid is reduced along the down-sloping channel 22 via the increasing width thereof.

The filtration tray 20 further has an overflow drain 23 located above the filtrating cavity 21 for draining the operation fluid out of the filtrating cavity 21 when the operation fluid is overflowed therein, so as to filtrate the residual particles out from the operation fluid. A level of the overflow drain is below a level of the exit of the down-sloping channel. Accordingly, the operation fluid is slowly filled into the filtrating cavity 21 to ensure the visible residual particles in the operation fluid being deposited at the cavity bottom wall 212 of the filtrating cavity 21. In particular, the overflow drain 23 is located at the second side portion 214 of the filtrating cavity 21, wherein the direction of the operation fluid is detoured to flow from the first side portion 213 of the filtrating cavity 21 through the second side portion 214 thereof to the overflow drain 23. The overflow drain 23 is located adjacent to the exit of the down-sloping channel 22, such that the flow direction of the operation fluid along the down-sloping channel 22 is opposite to the flow direction of the operation fluid toward the overflow drain 23. In other words, the operation fluid is guided to flow 180° within the filtration cavity 21.

The filtration tray 20 further has a drain ceiling wall 24 integrally extended from the cavity surrounding wall 211 at the second side portion 213 of the filtrating cavity 21, wherein the overflow drain 23 is formed at the drain ceiling wall 24. The overflow drain 23 is located adjacent to the cornering portion 215 of the filtration cavity 21. It is worth mentioning that the drain ceiling wall 24 is located above the cavity bottom wall 212 of the filtrating cavity 21. The filtration tray 20 further has a raised blocking flange 241 upwardly protruded from the cavity surrounding wall 211 along the drain ceiling wall 24, such that when the operation fluid is overflowed at the filtrating cavity 21, the operation fluid must flow over the raised blocking flange 241 to reach the overflow drain 23.

The fluid collecting tray 30 is detachably coupled underneath the filtration tray 20 is supported by the supporting frame 14 for collecting the operation fluid drained from the overflow drain 23. The fluid collecting tray 30 has first and second cavities 31, 32, wherein the fluid collecting tray 30 provides a second filtration stage and third filtration stage. At the second filtration stage, the operation fluid is slowly filled in the first cavity 31 from the filtration cavity 21 to ensure slurry residual particles in the operation fluid being deposited at the first cavity 31. At the third filtration stage, the operation fluid is slowly filled in the second cavity 32 from the first cavity 31 to ensure the slurry residual particles being filtrated out of the operation fluid.

As shown in FIG. 2, the fluid collecting tray 30 further has a collecting reservoir 33 and a partition wall 34 extended from a bottom of the collecting reservoir 33 for partitioning the collecting reservoir 33 into the first cavity 31 for receiving the operation fluid drained from the overflow drain 23 and the second cavity 32 for receiving the operation fluid from the first cavity 31 when the operation fluid overflows the partition wall 34. Preferably, the partition wall 34 is longitudinally formed at a mid-portion of the fluid collecting tray 30 to partition the collecting reservoir 33 into two even halves i.e. the first cavity 31 and the second cavity 32.

The partition wall 34 has at least a top passing notch 341 indented at a top edge of the partition wall 34 for allowing the operation fluid to flow from the first cavity 31 to the second cavity 32. Preferably, two top passing notches 341 are formed at two ends of the partition wall 34 respectively, such that the operation fluid can flow from the first cavity 31 to the second cavity 32 at two ends of the partition wall 34 along the top passing notches 341.

The operation fluid that overflows from the filtration tray 20 collects in the first cavity 31 where it slowly collects, wherein the operation fluid in the first cavity 31 is free of visible debris and/or contaminants. Then, the operation fluid that overflows from the first cavity 31 collects in the second cavity 32, where the majority of the operation fluid is free of micro debris and is less saturated of slurry reducing fluid pump wear.

As shown in FIG. 2, the fluid collecting tray 30 further comprises an elongated drain collector 35 extended outwardly to align with and located below the overflow drain 23 for guiding the operation fluid from the overflow drain 23 to the first cavity 31. The fluid collecting tray 30 further has a drain hole 36 located at the second cavity 32 and above a bottom wall thereof for draining the operation fluid out of the second cavity 32 when overflowing. Accordingly, the second cavity 32 will be used to further collect sludge deposited as operation fluid drains out via the drain hole 36.

For improving the filtration result, a fluid collector 40, such as a bucket, can be simply placed under the fluid collecting tray 30 to align with the drain hole 36 for collecting the clean and filtrated operation fluid overflowed from the second cavity 32 and drained out from the drain hole 36. In other words, the rivering filtration system of the present invention further provides a fourth filtration stage via the fluid collector 40 to filtrate the operation fluid. Accordingly, the fluid pump 15, such as a water pump, can be placed in the fluid collector 40 for pumping the operation fluid therefrom back to the fluid nozzle unit 13 of the operation fluid delivery arrangement for delivering the clean and filtrated operation fluid onto the cutting blade 11. It is worth mentioning that when the drain hole 36 is closed, the fluid pump 15 can be placed in the second cavity 32 to deliver the operation fluid therein back to the fluid nozzle unit 13. When the drain hole 36 is opened, the fluid pump 15 can be placed the fluid collector 40 to deliver the operation fluid therefrom back to the fluid nozzle unit 13.

Figure 4:
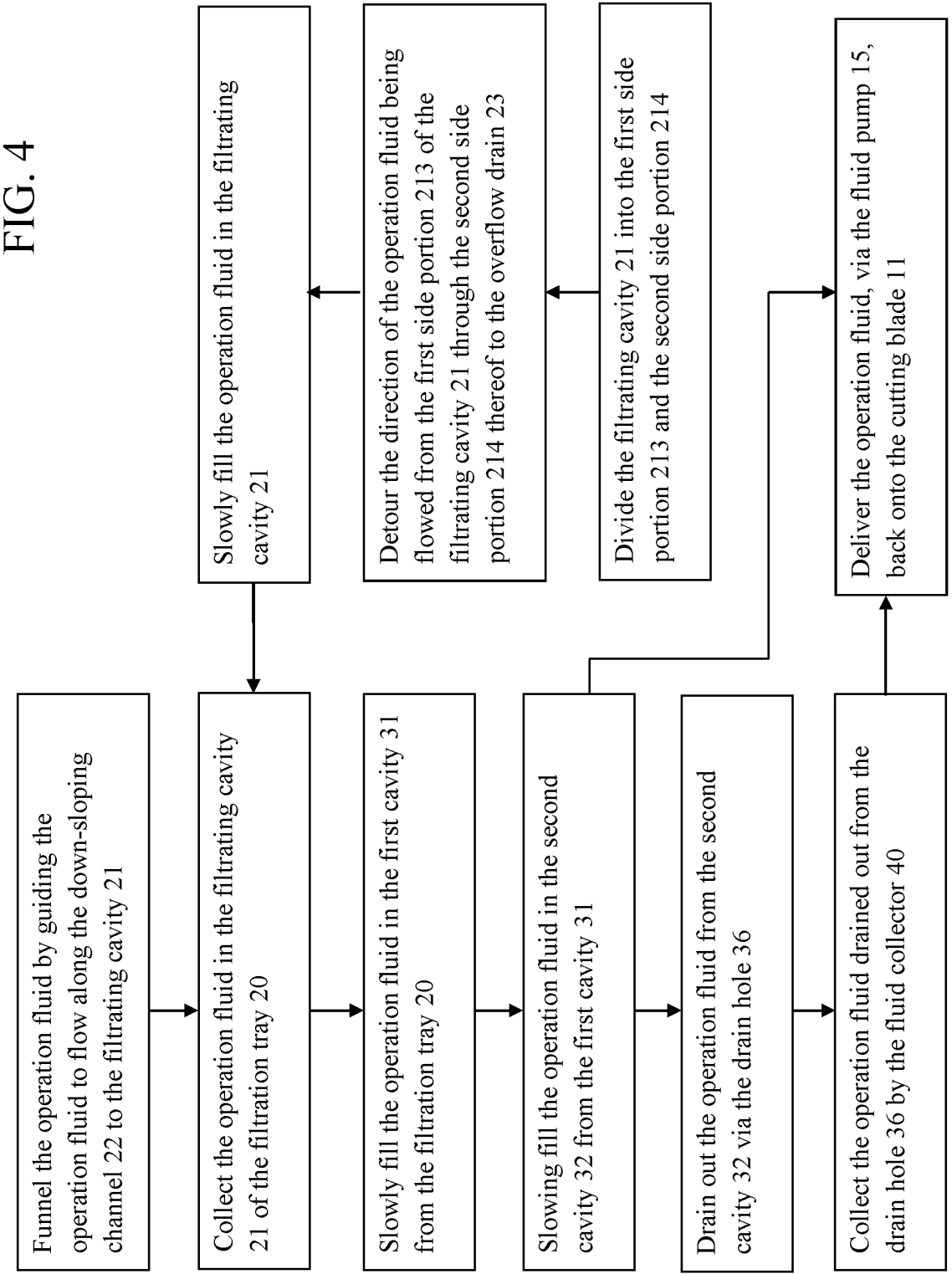
FIG. 4 is a block diagram illustrating a rivering filtration method according to the above preferred embodiment of the present invention.

As shown in FIG. 4, the present invention further comprises a rivering filtration method which comprises the following steps.

(A) Collect the operation fluid in the filtrating cavity 21 of the filtration tray 20 which is supported underneath the cutting blade to ensure the visible residual particles in the operation fluid being deposited at the filtrating cavity 21, so as to filtrate the visible residual particles out from the operation fluid by the filtration tray 20.

(B) Slowly fill the operation fluid in the first cavity 31 of the fluid collecting tray 30 from the filtration tray 20 to ensure the slurry residual particles in the operation fluid being deposited at the cavity bottom wall of the first cavity 31.

(C) Slowing fill the operation fluid in the second cavity 32 from the first cavity 31 to ensure the slurry residual particles being filtrated out of the operation fluid.

The step (A) further comprises the following steps.

(A.1) Slowly fill the operation fluid in the filtrating cavity 21 to ensure the visible residual particles in the operation fluid being deposited at the cavity bottom wall 212 of the filtrating cavity 21, wherein the step (A.1) further comprises the steps of:

(A.1.1) dividing the filtrating cavity 21 into the first side portion 213 and the second side portion 214 that the overflow drain 23 is located at the second side portion 214; and (A.1.2) detouring the direction of the operation fluid being flowed from the first side portion 213 of the filtrating cavity 21 through the second side portion 214 thereof to the overflow drain 23.

(A.2) Drain out the operation fluid from the filtrating cavity 21 via the overflow drain 23 which is located above the filtrating cavity 21 when the operation fluid is overflowed therein, so as to filtrate the visible residual particles out from the operation fluid.

Before the step (A), the method further comprises a step of funneling the operation fluid before filling the operation fluid in the filtrating cavity 21 by guiding the operation fluid to flow along the down-sloping channel 22 to the filtrating cavity 21 so as to land the larger size of the residual particle on the down-sloping channel 22.

After the step (C), the method further comprises the following steps.

(D) When the operation fluid overflows at the second cavity 32, drain out the operation fluid from the second cavity 32 via the drain hole 36.

(E) Collect the operation fluid drained out from the drain hole 36 by the fluid collector 40.

(F) Deliver the operation fluid, via the fluid pump 15, back onto the cutting blade 11 after the operation fluid is collected by the fluid collector 40 by placing the fluid pump 15 in the fluid collector 40.

Alternatively, after the step (c), the method further comprises a step of pumping the operation fluid in the second cavity 32 back to deliver onto the cutting blade 11 by placing the fluid pump 15 in the second cavity 32.

Therefore, the present invention provides a pre-filtration stage, i.e. the funneling step, and four different filtration stages to complete the filtration treatment of the operation fluid as shown in FIG. 5. Therefore, the clean and filtered operation fluid can be immediately re-used for the cutting operation. It is worth mentioning that the rivering filtration system can be incorporated with any existing power saw machine to process the filtration treatment of the operation fluid.

Figure 6:
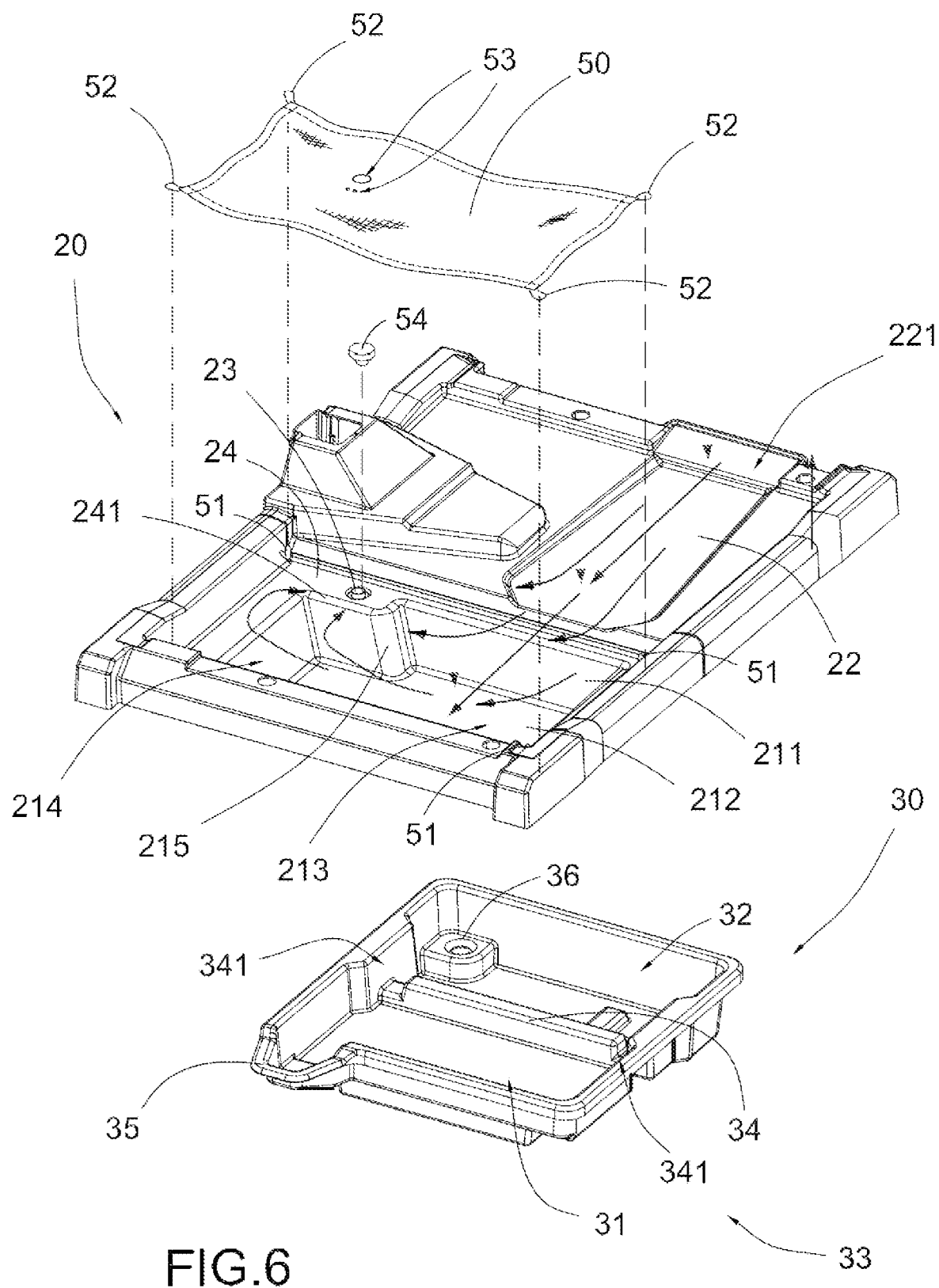
FIG. 6 is a first alternative mode of the rivering filtration system according to the above preferred embodiment of the present invention.
Figure 7:
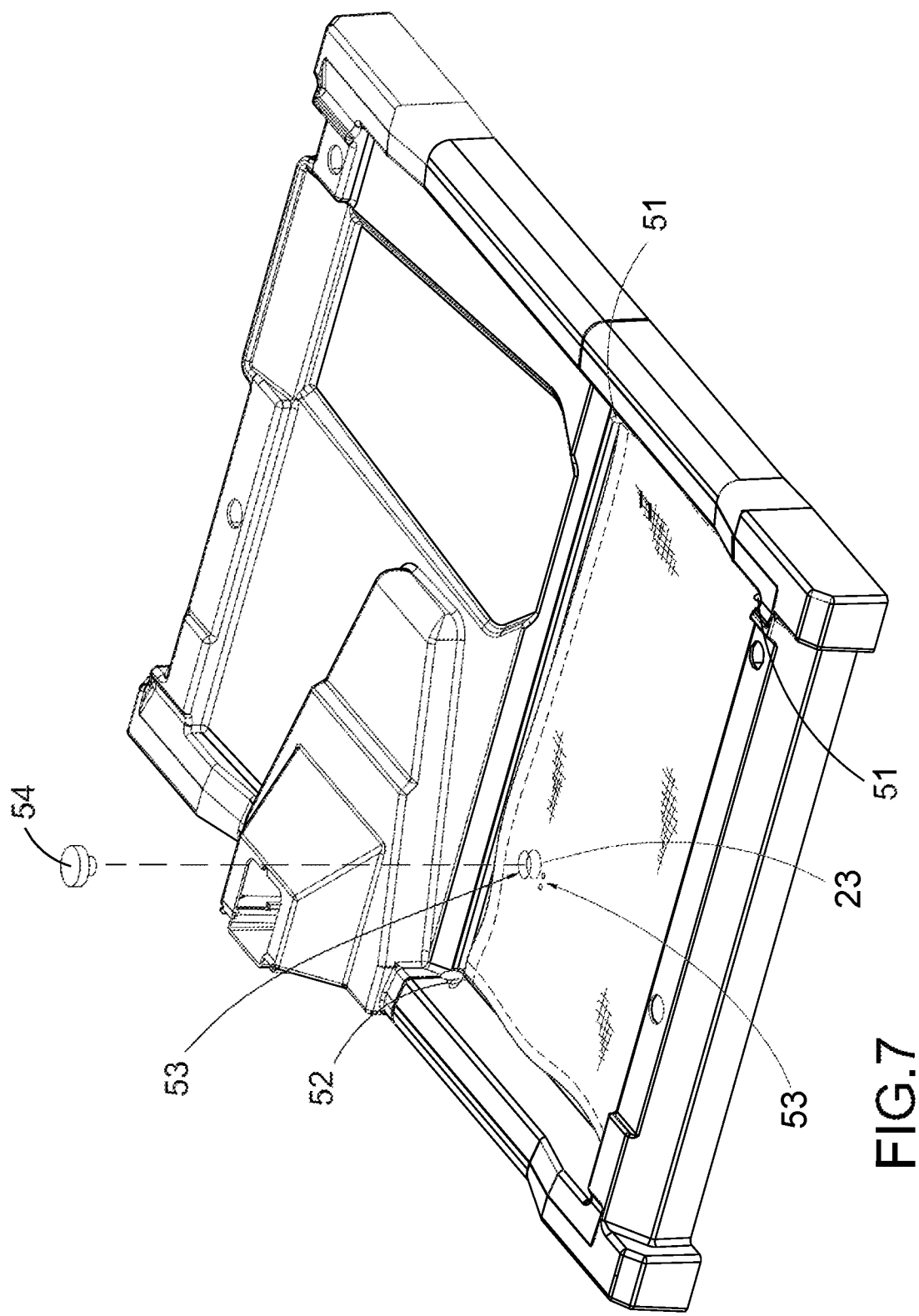
FIG. 7 illustrates the collecting reservoir of the fluid collecting tray covered by the filtering element according to the above preferred embodiment of the present invention.

As shown in FIGS. 6 and 7, a first alternative mode of the rivering filtration system is illustrated as a modification of the above embodiment. As it is mentioned above, the rivering filtration system is located underneath the cutting head arrangement for collecting operation fluid and filtrating residual particles in the operation fluid with multiple filtration stages so as to separate different sizes of the residual particles in the operation fluid after the operation fluid is delivered onto the cutting blade 11.

Accordingly, the rivering filtration system further comprises a filtering element 50 is located underneath the cutting head arrangement for filtering heavy debris and/or slurry residual particles in the operation fluid after the operation fluid is delivered onto the cutting blade 11. In this modification, the filtering element 50 is detachably disposing at the filtration tray 20 for filtering the heavy debris in the operation fluid before entering into the filtration tray 20. Particularly, the filtering element 50 is provided at the filtration tray 20 for filtering the operation fluid.

According to the preferred embodiment, the filtration tray 20 is supported underneath the cutting blade 11 and above the fluid collecting tray 30, wherein the filtering element 50 is located at and supported by the filtration tray 20. As it is mentioned above, the filtrating cavity 21 of the filtration tray 20 for collecting larger size of the residual particles in the operation fluid at the filtrating cavity 21 after the operation fluid is delivered onto the cutting blade 11. The overflow drain 23 of the filtration tray 20 is located above the filtrating cavity 21 for draining the slurry residual particles in the operation fluid out of the filtrating cavity to the fluid collecting tray 30. Therefore, the operation fluid is guided to pass to the filtration tray 20 from the filtering element 50. In case, the larger sizes of the residual particles in the operation fluid at the filtrating cavity 21 discharge therefrom, the filtering element 50 is able to catch the residual particles in the operation fluid to prevent the larger residual particles in the operation fluid entering into the filtrating cavity 21.

Particularly, the filtrating cavity 21 of the filtration tray 20 is covered by the filtering element 50, wherein the filtering element 50 is located above the filtrating cavity 21 of the filtration tray 20, such that the heavy debris in the operation fluid is filtered by the filtering element 50 before entering in the filtrating cavity 21. In other words, before the operation fluid is drained out of the filtrating cavity 21, the operation fluid will be filtered by the filtering element 50 before the operation fluid is collected in the filtrating cavity 21 of the filtration tray 20.

Accordingly, the filtering element 50 is located at a position that the exit of the down-sloping channel 22 is aligned with the filtering element 50, wherein the operation fluid is guided to flow along the down-sloping channel 22 to the filtering element 50.

It is worth mentioning that the filtering element 50 is made of mesh material and has a layer structure. The filtering element 50 can be constructed to have a single layer structure, double layer structure or multiple layer structure. The filtering element 50 can be embodied as a filtering bag or filtering net to filter and collect heavy debris and/or the slurry residual particles in the operation fluid. Likewise, the filtering element 50 can be embodied as a filtering paper as well. The filtering element 50 can be made of reusable and washable material such as fibered filtering material, or made be made of disposable and recycling material such as filter paper.

As shown in FIGS. 6 and 7, the filtering element 50 is shaped corresponding to a shape of the filtrating cavity 21, wherein a size of the filtering element 50 is at least the same as a size of the filtrating cavity 21, such that the filtrating cavity 21 of the filtration tray 20 is entirely covered by the filtering element 50. Preferably, the size of the filtering element 50 is larger than the size of the filtrating cavity 21, such that when the filtrating cavity 21 is covered by the filtering element 50, the filtering element 50 is retained in a sagging manner. Preferably, the filtering element 50 is large enough to cover the first side portion 213, the second side portion 214 and the cornering portion 215 of the filtrating cavity 21.

Preferably, the filtering element 50 is slightly stretched and is supported at the filtrating cavity 21, wherein a center portion of the filtering element 50 is slightly sagged toward the filtrating cavity 21. As a result, the operation fluid is accumulatively collected and filtered at a center portion of the filtering element 50. Preferably, the sagging portion of the filtering element 50 is located at and aligned with the center of the filtrating cavity 21, such that the filtered operation fluid, i.e. the operation fluid after filtered by the filtering element 50, from the filtering element 50 is guided to fill at the filtrating cavity 21.

The filtering element 50 further has one or more through drain holes 53 formed thereon for releasing the operation fluid to the filtrating cavity 21 in an overflowing manner when the filtering element 50 is disposed at the filtrating cavity 21. Preferably, there are three through drain holes 53 spacedly formed at the filtering element 50, wherein one of the through drain holes 53 has a larger diameter size while two of the through drain holes 53 has a smaller diameter size. Preferably, one of the through drain holes 53 are formed and aligned with the overflow drain 23. The purpose of the filtering element 50 is to relieve the operation fluid built-up at the filtering element 50. It is ideal to filter the operation fluid by the filtering element 50 by passing operation fluid through the filtering element 50. In case the operation fluid may pass through the filtering element 50 slowly to accumulate the operation fluid at the filtering element 50, some of the operation fluid can by-pass the filtering element 50 and overflow out freely via the through drain holes 53, such that the operation fluid can directly flow out of the filtration tray 20 through the through drain holes 53 and the overflow drain 23 without flowing into the filtrating cavity 21. Preferably, the through drain hole 53 having the larger diameter is aligned with the overflow drain 23, wherein the two through drain holes 53 having the smaller diameter are two supplemental holes for allowing the operation fluid easily discharging through the through drain hole 53 having the larger diameter. Preferably, the diameter of the through drain hole 53 having the larger diameter matches with the diameter of the overflow drain 23. Once the cutting job is completed, the filtering element 50 can be removed from the filtration tray 20 to allow the remainder of the operation fluid slowly filtered. The filtered operation fluid is clean and can be re-used for next cutting operation.

The filtration tray 20 further comprises a drain stopper 54 detachably coupled at the overflow drain 23, wherein the drain stopper 54 is coupled at the overflow drain 23 for allowing the filtered operation fluid being contained in the filtrating cavity 21 and is detached from the overflow drain 23 for discharging the filtered operation fluid. It is worth mentioning that the overflow drain 23 of the filtration tray 20 can be also covered by the filtering element 50, such that the operation fluid will be filtered by the filtering element 50 before discharging through the overflow drain 23. Preferably, the drain stopper 54 can be detachably coupled at the overflow drain 23 through the through drain hole 53 (larger diameter). In other words, the drawing stopper 54 is coupled on the filtering element 50 at the through drain hole 53 to detachably couple at the overflow drain 23. Therefore, when the drain stopper 54 is detached, the operation fluid will be discharged to the overflow drawing 23 through the through drain hole 53. It is worth mentioning that the operation fluid is filtered by the filtering element 50 and is then collected in the filtration tray 20. The operation fluid can then be discharged from the filtration tray 20 via the overflow drain 23 to the fluid collecting tray 30.

According to the preferred embodiment, an attaching unit is provided in order to detachably attach the filtering element 50 at the filtration tray 20. In one embodiment, the attaching unit comprises a plurality of first attaching elements 51 spacedly formed at cavity surrounding wall 211 of the filtration tray 20, and a plurality of second attaching elements 52 spacedly formed at a peripheral edge portion of the filtering element 50, such that when the second attaching elements 52 are detachably attached to the first attaching elements 51 respectively, the filtering element 50 is attached to the filtration tray 20 to cover the filtrating cavity 21. In one example, the first attaching elements 51 are a plurality of attaching hooks provided at corners of the cavity surrounding wall 211 of the filtrating cavity 21 respectively. The second attaching elements 52 are a plurality of attaching loops provided at corners of the filtering element 50 respectively to detachably attach to the attaching hooks respectively. In another example, the first attaching elements 51 and the second attaching elements 52 can be hook and loops fasteners respectively to achieve the detachable attachment between the filtering element 50 and filtration tray 20.

According to the rivering filtration method, before the step (A), the method further comprises the steps of guiding the operation fluid to the filtration tray 20 through the filtering element 50, filtering the operation fluid by the filtering element 50, and guiding the filtered operation fluid to the filtrating cavity 21.

Figure 8:
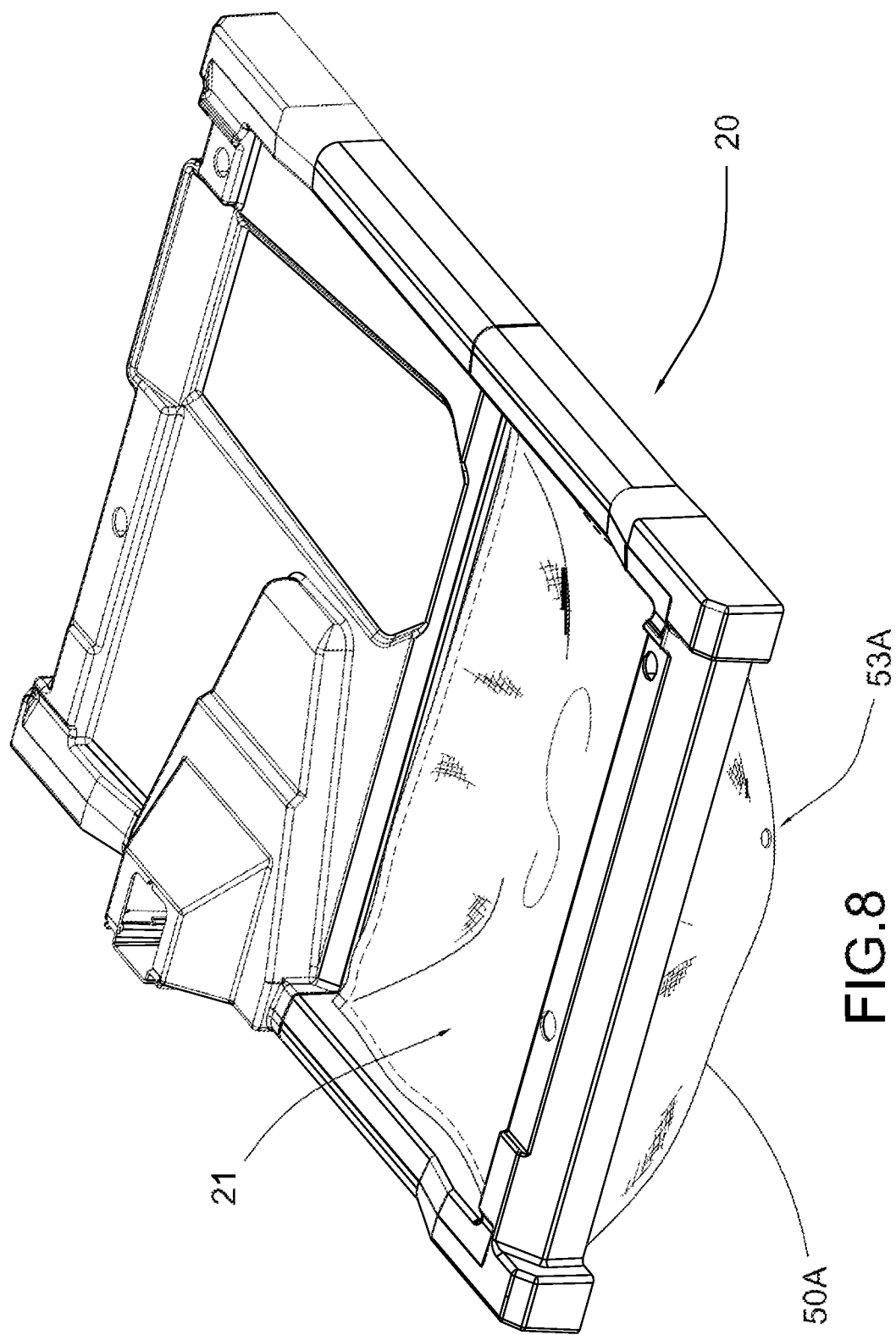
FIG. 8 is a second alternative mode of the rivering filtration system according to the above preferred embodiment of the present invention.

FIG. 8 illustrates another modification of the preferred embodiment, wherein the filtering element 50A, having the through drain holes 53A thereon, is integrated with the filtration tray 20. Accordingly, the filtering element 50A is integrated with a bottom wall of the filtration tray 20, such that the filtering element 50A forms a bottom of the filtrating cavity 21.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A power saw machine, comprising:
    a cutting head arrangement which comprises a cutting blade being driven to rotate for contacting with a work piece during a cutting operation; and
    a rivering filtration system located underneath said cutting head arrangement for collecting operation fluid and filtrating residual particles in the operation fluid with multiple filtration stages so as to separate different sizes of the residual particles in the operation fluid after the operation fluid is delivered onto said cutting blade, wherein said rivering filtration system comprises a filtering element made of mesh material located underneath said cutting head arrangement for filtering heavy debris in the operation fluid after the operation fluid is delivered onto said cutting blade, wherein said rivering filtration system further comprises a filtration tray, which is supported underneath said cutting blade, having a filtrating cavity for collecting larger size of the residual particles in the operation fluid at said filtrating cavity and comprising an overflow drain located above said filtrating cavity for draining the slurry residual particles in the operation fluid out of said filtrating cavity, wherein said filtering element is detachably disposed at said filtrating cavity to cover said overflow drain.

2. The power saw machine, as recited in claim 1, wherein said filtering element has one or more through drain holes formed thereon for releasing the operation fluid in an overflowing manner when said filtering element is disposed at said filtrating cavity.

3. The power saw machine, as recited in claim 2, wherein one of said one or more through drain holes formed on said filtering element is aligned with said overflow drain.

4. The power saw machine, as recited in claim 1, wherein said filtration tray further comprises a bottom wall integrated with said filtering element, such that said filtering element forms a bottom of said filtrating cavity.

5. The power saw machine, as recited in claim 1, wherein rivering filtration system further comprises a fluid collecting tray which has a collecting reservoir and a partition wall extended from a bottom of said collecting reservoir for partitioning said collecting reservoir into a first cavity for receiving the operation fluid drained from said overflow drain and a second cavity for receiving the operation fluid from said first cavity when the operation fluid overflows said partition wall.

6. The power saw machine, as recited in claim 5, wherein said partition wall has at least a top passing notch indented at a top edge of said partition wall for allowing the operation fluid to flow from said first cavity to said second cavity.

7. The power saw machine, as recited in claim 5, wherein said fluid collecting tray further comprises an elongated drain collector extended outwardly to align with and located below said overflow drain for guiding the operation fluid from said overflow drain to said first cavity.

8. The power saw machine, as recited in claim 5, wherein said fluid collecting tray further has a drain hole located at said second cavity and above a bottom wall thereof for draining the operation fluid out of said second cavity when overflowing.

9. The power saw machine, as recited in claim 5, wherein said filtration tray further comprises a drain stopper detachably coupled at said overflow drain, such that said drain stopper is coupled at said overflow drain for allowing the filtered operation fluid being contained in said filtrating cavity and is detached from said overflow drain for discharging the filtered operation fluid.

10. The power saw machine, as recited in claim 5, further comprising an attaching unit, wherein said filtration tray comprises a cavity surrounding wall to define said filtrating cavity therewithin, wherein said attaching unit comprises a plurality of first attaching elements spacedly formed on said cavity surrounding wall, and a plurality of second attaching elements spacedly formed at a peripheral edge portion of said filtering element, such that when said second attaching elements are detachably attached to said first attaching elements respectively, said filtering element is attached to said filtration tray to cover said filtrating cavity.

11. The power saw machine, as recited in claim 5, wherein said filtration tray further comprises a down-sloping channel for guiding the operation fluid from said cutting blade along said down-sloping channel to said filtering element at said filtrating cavity of said filtration tray.

12. The power saw machine, as recited in claim 1, wherein said filtration tray further comprises a down-sloping channel for guiding the operation fluid from said cutting blade along said down-sloping channel to said filtering element at said filtrating cavity of said filtration tray.

13. The power saw machine, as recited in claim 12, wherein said filtrating cavity has a first side portion communicating with an exit of said down-sloping channel, an opposed second side portion, and a cornering portion formed between said first side portion and said second side portion for detouring a direction of the operation fluid being flowed from said first side portion of said filtrating cavity to said second side portion thereof, wherein said filtering element is large enough to cover said first side portion, said second side portion and said cornering portion of said filtrating cavity.

* * * * *